United States Patent [19]

Stokes

[11] Patent Number: 5,115,291
[45] Date of Patent: May 19, 1992

[54] ELECTROSTATIC SILICON ACCELEROMETER

[75] Inventor: John F. Stokes, Wyoming, Minn.

[73] Assignee: Honeywell Inc., Minneapolis, Minn.

[21] Appl. No.: 730,037

[22] Filed: Jul. 12, 1991

Related U.S. Application Data

[63] Continuation of Ser. No. 386,338, Jul. 27, 1989, abandoned.

[51] Int. Cl.⁵ .................. G01P 15/08; H01G 7/00
[52] U.S. Cl. .................. 357/26; 73/517 AV; 73/517 R; 357/74; 357/71; 357/49
[58] Field of Search .......... 357/26, 74; 73/517 R, 73/517 AV

[56] References Cited

U.S. PATENT DOCUMENTS

| | | | |
|---|---|---|---|
| 4,430,895 | 2/1984 | Colton | 73/517 R |
| 4,435,737 | 3/1984 | Colton | 73/517 R |
| 4,483,194 | 11/1984 | Rudolf | 73/517 R |
| 4,553,436 | 11/1985 | Hansson | 73/517 AV |
| 4,670,092 | 6/1987 | Motamedi | 73/517 R |
| 4,699,006 | 10/1987 | Boxenhorn | 73/517 AV |
| 4,711,128 | 12/1987 | Boura | 73/517 B |
| 4,736,629 | 4/1988 | Cole | 73/517 R |
| 4,784,721 | 11/1988 | Holmen et al. | 317/26 |
| 4,836,025 | 6/1989 | Mihara | 73/517 R |
| 4,851,080 | 7/1989 | Howe et al. | 73/517 AV |
| 4,864,463 | 9/1989 | Shkedi et al. | 73/718 |
| 4,872,342 | 10/1989 | Hanson et al. | 73/517 R |
| 4,882,933 | 11/1989 | Petersen et al. | 73/517 R |
| 4,891,985 | 1/1990 | Glenn | 73/517 R |
| 4,893,509 | 1/1990 | MacIver et al. | 73/517 AV |
| 4,920,801 | 5/1990 | Church | 73/517 B |
| 4,922,756 | 5/1990 | Henrion | 73/517 R |
| 4,928,203 | 5/1990 | Swindal et al. | 73/517 AV |
| 4,939,935 | 7/1990 | Amand | 73/517 AV |

FOREIGN PATENT DOCUMENTS

| | | | |
|---|---|---|---|
| 0195985 | 10/1986 | European Pat. Off. | 73/718 |
| 60-97677 | 5/1985 | Japan | 357/26 |
| 2194341 | 3/1988 | United Kingdom | 73/517 R |

OTHER PUBLICATIONS

"Accelerometer on a chip", Machine Design, Jan. 8, 1971 p. 116.

Primary Examiner—Andrew J. James
Assistant Examiner—Viet Q. Nguyen
Attorney, Agent, or Firm—Merchant, Gould, Smith, Edell, Welter & Schmidt

[57] ABSTRACT

A solid state accelerometer having an all silicon sensor for measuring accelerational and gravitational forces. The accelerometer measuring system also has associated electronics that include an analog rebalance loop and a digitizer loop.

12 Claims, 7 Drawing Sheets

DEPOSIT P+ EPI
PATTERN FLEXURES
FIG. 3A

FUSION BOND
Si TO Si
FIG. 3B

GROW SiO$_2$ & SiN$_3$
PATTERN DIELECTRIC
FIG. 3C

DEPOSIT ETCH MASK
PATTERN PROOF MASS
ANISOTROPIC Si ETCH
FIG. 3D

BOND BOTTOM STOP
ANISOTROPIC Si ETCH
FIG. 3E

BOND TOP STOP
SAW
BOND WIRES
TEST
FIG. 3F

ELECTROSTATIC SILICON ACCELEROMETER

This is a continuation of application Ser. No. 07/386,338 filed Jul. 27, 1989, now abandoned.

FIELD OF THE INVENTION

The present invention pertains to accelerometers and particularly to solid state accelerometers. More particularly, the invention pertains to electrostatic solid state accelerometers.

Background of the Invention

The related art includes accelerometers of the piezo electric, silicon piezo resistive and capacitive kinds. However, there has been a need for an advanced-technology, near-chip-size accelerometer with high reliability and long-term accuracy. The present invention is a response to that need. The invention, the electrostatic silicon accelerometer, is a solid state accelerometer having the capabilities of complementing future inertial navigational systems based on either ring laser or fiber optic gyroscopes. The greatest problem plaguing present-day accelerometers is long term drift that is virtually eliminated by the present invention. The invention has exceptional stability in terms of accuracy over extended periods of time, thereby eschewing the typical periodic calibrations necessary for related-art accelerometers. The major factor contributing to such stability is the single-material construction of the accelerometer.

Summary of the Invention

The present invention is a capacitive pickoff accelerometer which uses doped (conductive) silicon for the mechanical parts such as the diaphragm or pendulum, and other parts. These parts have a dual purpose which is performing the mechanical and electrical functions of the accelerometer. The use of doped silicon provides for mechanically stable bonding (such a fusion) and for electrically effective conduction.

The accelerometer is an all-silicon assembly having virtually no creep which is a material trait that is crucial for low bias drift and hysteresis. Mismatched coefficients of thermal expansion among the acceleration sensor capsule materials constitute a dominant factor in bias drift. Related-art silicon accelerometer designs contain material mismatches in two areas involving the metallization of the pendulum and stops to provide capacitor-plate pickoff and balance, and the use of Pyrex for the stops to facilitate thermal-electric (TE) bonding. The invention has eliminated such material mismatches by exclusively incorporating doped (conductive) silicon throughout its structure. The accelerometer is a monolithic, fully integrated silicon structure created at the wafer level to assure mechanical stability over time and temperature, thereby eliminating thermal and mechanical drift, and material creep. The accelerometer design is symmetrical and flextures of the pendulum or diaphragm are oriented through the pendulum or diaphragm center of gravity to reduce cross-axis sensitivity. The conductive silicon pendulum or diaphragm, and flextures in lieu of metallized silicon eliminate any bimetal effect in these structures. The solid state accelerometer utilizes capacitive pickoff and electrostatic rebalance for low cost and high stability. The pickoff and electrostatic rebalance are effected through common electrodes for enhanced performance and low cost. The associated electronics are placed on a separate integrated circuit chip to maintain high performance and low cost.

DESCRIPTION OF THE PREFERRED EMBODIMENTS

Figure 1:
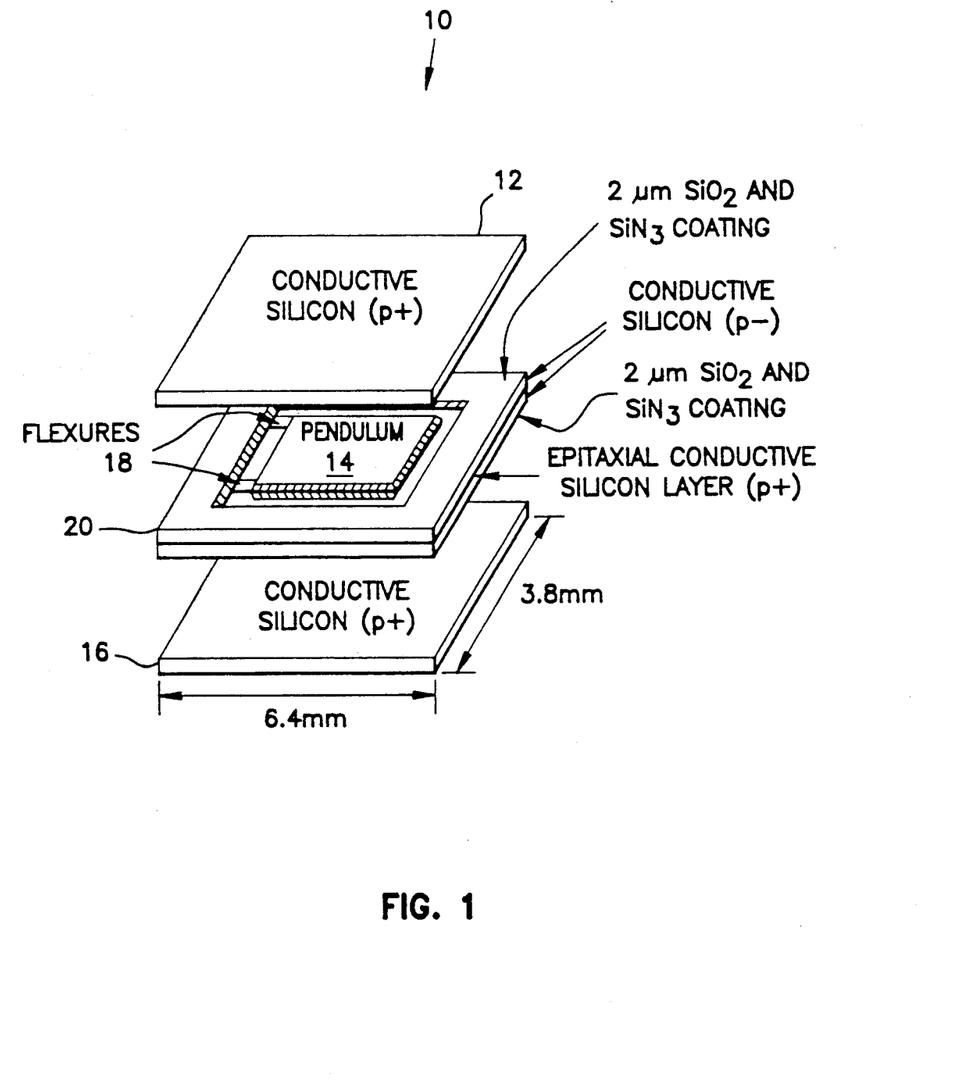
FIG. 1 is an exploded, perspective view of the invention.

Sensor capsule 10 of FIG. 1 has three major components which are plate 12, pendulum 14 and plate 16. Pendulum 14 is supported by flexures 18. Wafer 20 forms a rigid frame which holds flexures 18 in place and is a support structure to which plates 12 and 16 are adhered thereby forming capsule 10. Flexures 18 allow for movement of pendulum 14 relative to plates 12 and 16 such that pendulum 14 has the shape of a plate that is approximately parallel to the surfaces of plates 12 and 16. Without any inertial or gravitational force affecting pendulum 14, the neutral position of pendulum is equidistant from plates 12 and 16. An inertial or gravitational force perpendicular to the broadest surface of pendulum 14 causes pendulum 14 to move in a direction toward plate 12 or 16. For instance, if pendulum 14 is closer to plate 12, then it is obviously farther from plate 16; if there is an indication of a force in one direction and if pendulum 14 is closer to plate 16 than plate 12, then, of course, the force is in the other direction. Voltage is applied to pendulum 14 and plates 12 and 16, to electrostatically drive pendulum 14 back to its equidistant position with respect to plates 12 and 16.

Pendulum 14 and plates 12 and 16 are made of a conductive material which is a conductive silicon for the present embodiments. Plates 12 and 16 are composed of doped silicon (p+) and pendulum 14 is composed of a combination of layers of doped silicon (p+ and p− as separate layers), along with coatings of $SiO_2$ and $SiN_3$. Separate electrical connections are made to plates 12 and 16, and to pendulum 14, respectively. The varying distances between pendulum 14 and plates 12 and 16 are electrically determined as respective quantities of capacitance a force acting on the pendulum 14 in one direction of one plate or the other (12 or 16) increases the electrical capacitance between pendulum 14 and the respective plate, which electronically is converted, through high gain rebalance loop 50 of FIG. 5, into an indication of the amount of force in terms of gravitational units (g's) acting on pendulum 14. Rebalance loop 50 drives pendulum 14 back to its zero or null position tending to keep pendulum 14 stationary, with electrostatic force through voltage being applied across pendulum 14 and plates 12 and 16, respectively. The electrostatic force counteracting the accelerational or gravitational force on pendulum 14, is proportional to the square of the applied voltage. However, electronic linearization of the applied voltage results in a voltage proportional to the electrostatic force and indicative of the accelerational or gravitational force.

The inventive aspect of sensor capsule 10 is that all the elements are constructed with silicon thereby providing the advantages of accuracy, sensitivity, range, stability, miniaturization, power dissipation, ruggedness, and life span.

Typical specifications of solid state accelerometer 10, utilizing pendulum 14 and incorporating the associated electronics as described below, would be: 1) A measuring range from $\pm 1$ micro g to $\pm 40$ g's, with a resolution of 1 micro g; 2) A bias magnitude no more 2 milli g's and long term repeatability of 50 micro g's for 10 years duration; 3) A scale factor magnitude of 0.50 volt per g for an analog scale and 1.6 millimeter per second squared per pulse for a digital scale; 4) A scale factor nonlinearity of 10 parts per million and long term repeatability of 50 parts per million; 4) A input axis misalignment magnitude of 4 milliradians and long term repeatability of 80 microradians; 6) A cross-axis sensitivity of 15 micro g's per g squared; 7) A mechanical shock tolerance in all axes of 250 g's for 11 milliseconds; 8) A size and weight of sensor capsule 10 of 2 cubic centimeters and 4 grams, respectively; and 9) Power dissipation of less than 500 milliwatts. The operating temperature range is from $-55$ to $+96$ degrees Centigrade. The estimated mean time between failures is greater than 100,000 hours.

Typical construction characteristics of pendulum 14 would include a length of 0.381 centimeter, a width of 0.254 centimeter, a thickness of 0.015 centimeter, a mass of 0.015 gram, a pendulousity of $3.87 \times 10^{-3}$ gram-centimeter, and a polar moment of inertial of $1.3 \times 10^{-3}$ gram-centimeter$^2$. Characteristics of flexures 18 include a length of 0.025 centimeter, a width of 0.025 centimeter, a thickness of 3 micrometers, and an elastic restraint of 76.9 dyne-centimeters per radian. Other specifications of the accelerometer 10 system include a nominal gap width between stops 12 and 16 and pendulum 14 of 2 micrometers, a nominal working gap capacitance of 57 picofarads, a pickoff scale factor of 24,900 volts per radian, a nominal electronics gain of 1000 volts per volt, a damping constant of $2.5 \times 10^6$ dyne-seconds per centimeter, a torquer scale factor of 15.2 dyne-centimeters per volt, and a digitizer scale factor of 17,500 pulses per volt.

Figure 2:
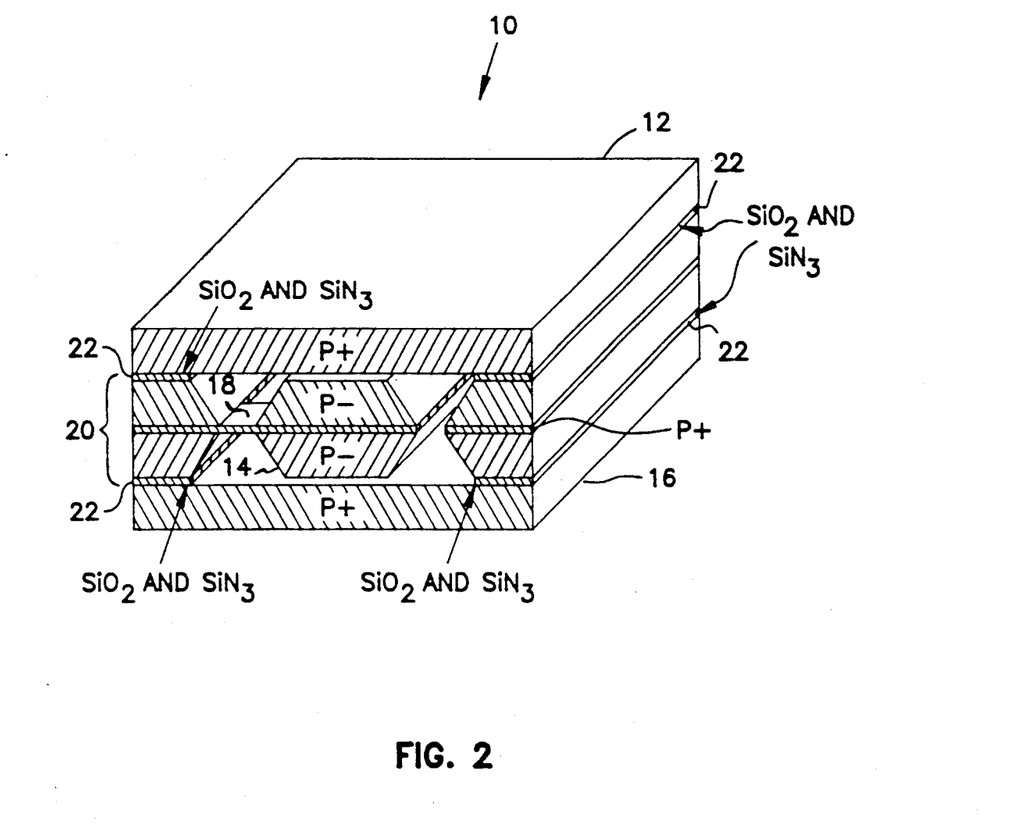
FIG. 2 is a cutaway view of the invention.

A cross-sectional view of sensor capsule 10 is shown in FIG. 2 having corresponding numerical designations of FIG. 1. Sensor capsule 10 is a monolithic mechanically integrated silicon structure fabricated using state-of-the-art micro-machining techniques. These techniques combine the precision of planar integrated circuit processing with wet and dry (plasma) etching and multiple wafer-to-wafer bonding to produce a three-dimensional micro-machined device. This approach permits structures to be fabricated with sub-micron tolerances while retaining the potential low cost of batch processing techniques.

Device 10 utilizes a combination of silicon fusion bonding techniques and epitaxial silicon films to form a monolithic single crystal silicon structure, with flexures 18 symmetrically located between two halves of proof mass 14. Flexure dimensions are controlled by high accuracy and patterning techniques. The upper 12 and lower 16 electrodes are formed from standard silicon wafers and bonded to the silicon support 20 using wafer-to-wafer bonding with a dielectric interlayer 22 for electrical isolation.

Figure 3A:
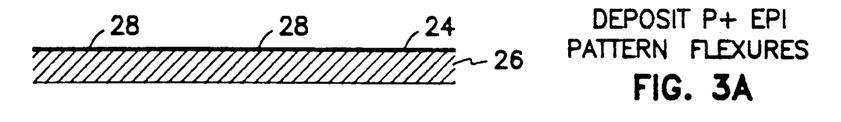
FIGS. 3a-f reveal the steps of the process for making the all silicon accelerometer.
Figure 3B:
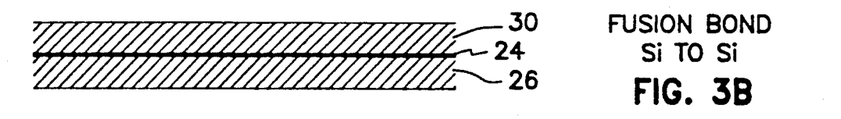
Figure 3C:
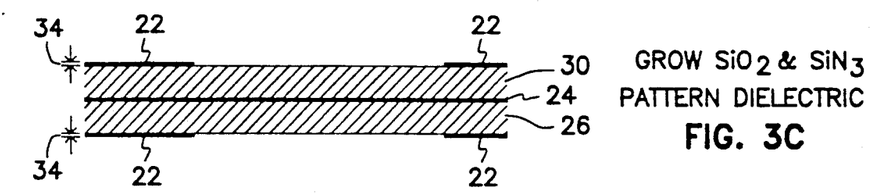
Figure 3D:
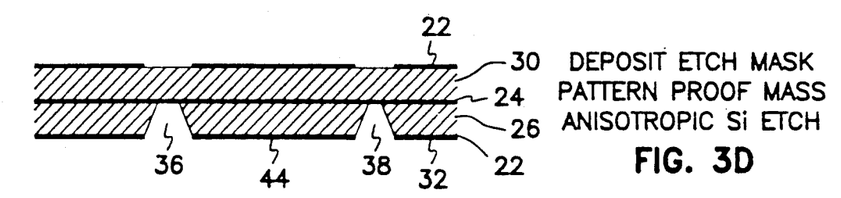
Figure 3E:
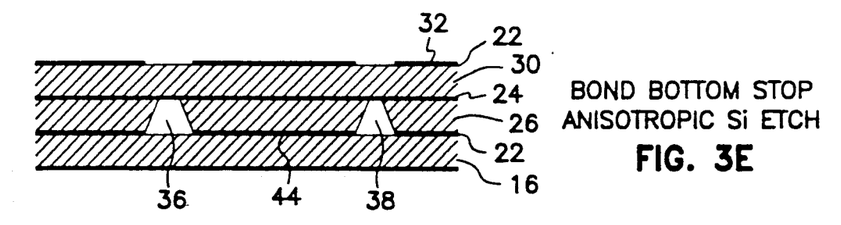
Figure 3F:
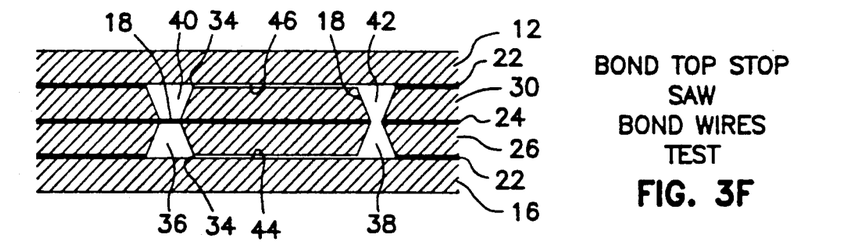

Cross-sectional views in FIGS. 3a-f illustrate the fabrication sequence of making capsule 10. To begin with FIG. 3a, p− doped layer 24 of epitaxial silicon is deposited on double-sided polished p− doped silicon wafer 26. Epitaxial silicon 24 is patterned with dry etch 28 to define flexures 18 and pendulum 14. Second silicon wafer 30 is fusion bonded to epitaxial silicon layer 24 in FIG. 3b. The two-wafer stack of wafers 26 and 30 is thermally oxidized to provide dielectric interlayer 22 which sets gap width 34 as noted in FIG. 3c. Pattern dielectric interlayer 22 is a growth of $SiO_2$ and $SiN_3$. The two-wafer stack is patterned with an etch resistant material 32 deposited on the stack. Wafer 26 is etched at points 36 and 38 using an anisotropic etch in FIG. 3d. Interlayer 22 at area 44 between points 36 and 38 is removed. P+ doped silicon stop wafer 16 is bonded to the two-wafer stack on the side of wafer 26 as shown in FIG. 3e. Resultant gap 34 exists between the two-wafer stack and wafer 16. Etch resistant material 32 is deposited with the desired pattern on the wafer 30 side of the two-wafer stack. Anisotropic etching is used thereby etching a points 40 and 42 to complete proof mass 14 and flexure 18 definition. Interlayer 22 at area 46 between points 40 and 42 is removed. The flexure material between points 38 and 42 is removed so that the inner portion of two-wafer stack may move as pendulum 14 about flexure 18. Then p+ doped silicon stop wafer 12 is fusion bonded to the two-wafer stack on the side of wafer 30 as illustrated in FIG. 3f. At this stage of construction, sensor capsule 10 is completely sealed from detrimental dust and debris, and is ready for dicing, wire bonding and testing.

Figure 4:
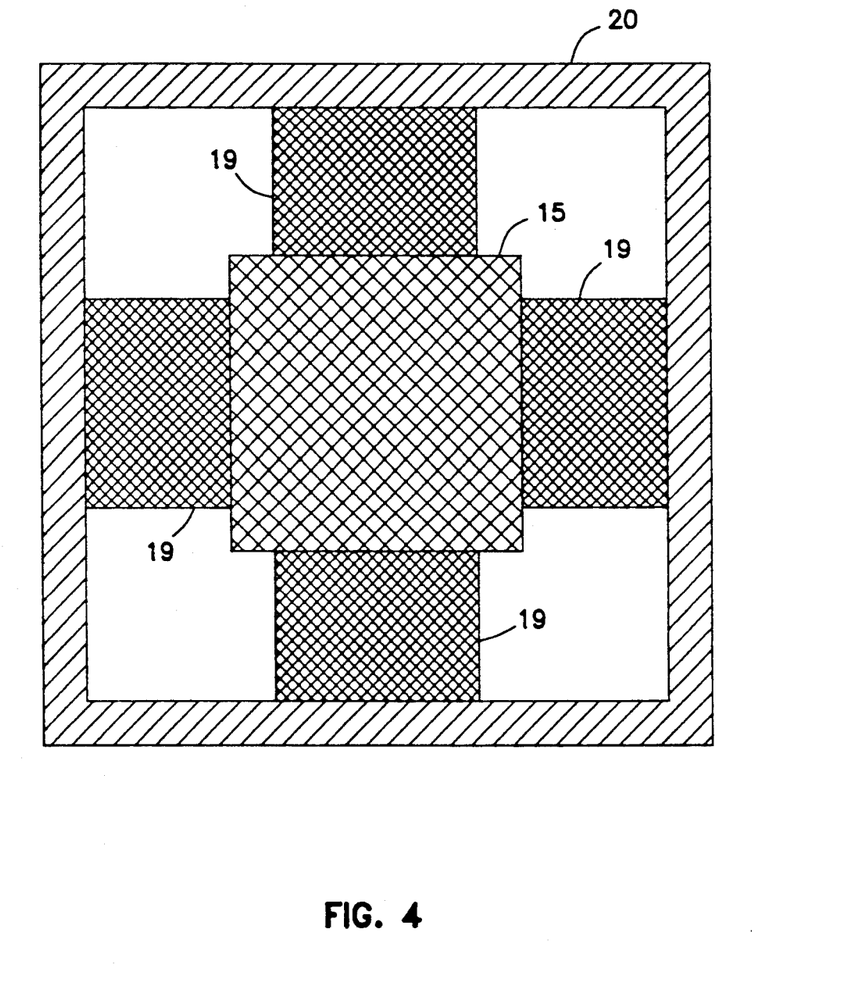
FIG. 4 shows a diaphragm which may used in lieu of the pendulum as another embodiment of the invention.

Pendulum 14 may be substituted with diaphragm 15 as illustrated in FIG. 4. The fabrication process is the same except flexures 19 are provided on four sides of square diaphragm 15. Solid state accelerometer 10 is functionally the same as accelerometer with pendulum 14 except that the diaphragm accelerometer is more rugged though less sensitive. Typical specifications of solid state accelerometer 10, utilizing diaphragm 15 having flexures 19, and incorporating the associated electronics as described below, would be: 1) A measuring range from $\pm 20$ micro g's to $\pm 100$ g's, with a resolution of 5 micro g's; 2) A bias magnitude no more 10 milli g's and long term repeatability of 1 milli g for 15 years duration; 3) A scale factor magnitude of 0.20 volt per g for an analog scale and 0.64 millimeter per second squared per pulse for a digital scale; 4) A scale factor nonlinearity of 100 parts per million and long term repeatability of 500 parts per million; 4) A input axis misalignment magnitude of 10 milliradians and long term repeatability of 1 milliradian; 6) A cross-axis sensitivity of 100 micro g's per g squared; 7) A mechanical shock tolerance in all axes of 20,000 g's for 7 milliseconds; 8) A size and weight of sensor capsule 10 of 2 cubic centimeters and 4 grams, respectively; and 9) Power dissipation of about 500 milliwatts. The operating temperature range is from $-55$ to $+96$ degrees Centigrade. The estimated mean time between failures is greater than 100,000 hours.

Pickoff of accelerometer is achieved by measuring the capacitance change as pendulum 14 or diaphragm 15 moves towards and away from silicon stops 12 and 16 under external acceleration. Rebalance is achieved by applying electrostatic forces to force pendulum 14 or diaphragm 15 to a null position. Silicon stops 12 and 16 are used, not only for mechanical supports and signal pickoff, but also for rebalance by separating the pickoff and rebalance frequencies. The electronics for accelerometer 10 include analog rebalance loop 50 of FIG. 5 and digitizer loop 60 of FIG. 6. Analog rebalance loop 50 includes sin wave generator 54 connected to differential amplifier 56 and switches 58. The output of amplifier 56 is connected to a capacitance bridge consisting of ultra stable metal-oxide-semiconductor (MOS) capacitors and the variable capacitances of the gaps between pendulum 14 or diaphragm 15 and stops 12 and 16 of accelerator 10. The common connection of the accelerometer capacitances, which is pendulum 14 or diaphragm 15, is connected to ultra-stable voltage reference 52. The output of amplifier 56 also goes to peak detector 66. Differential amplifier 68 has its inputs connected to the output of detector 66 and to voltage reference 52. The output of amplifier 68 is fed back to generator 54. The outputs of the capacitance bridge involve connections to stops 12 and 16 which are capacitively coupled to the inputs of differential amplifier 70. The differential outputs of amplifier 70 go to switches 58, which in turn have outputs connected to the inverting input of differential amplifier 72. Differential amplifier 74 has a bias adjust input and an output connected to the non-inverting input of amplifier 72. The output of amplifier 72 goes to the non-inverting inputs of differential amplifiers 76 and 78. The outputs of amplifiers 76 and 78 are fed back to the inverting and non-inverting inputs, respectively, of amplifier 70. The outputs of amplifiers 76 and 78 are the positive analog scale factor and the negative scale factor voltages, respectively. The analog scale factor (SF) is governed essentially by equation $SF = Kd^2/e_r V_b$ where d is gap width 34, $e_r$ is the dielectric constant of the gap, $V_b$ is the bias voltage used to linearize the scale factor and K is a constant of the geometry of the accelerometer 10 pendulum 14 or diaphragm 15 in combination with stops 12 and 16.

Figure 5:
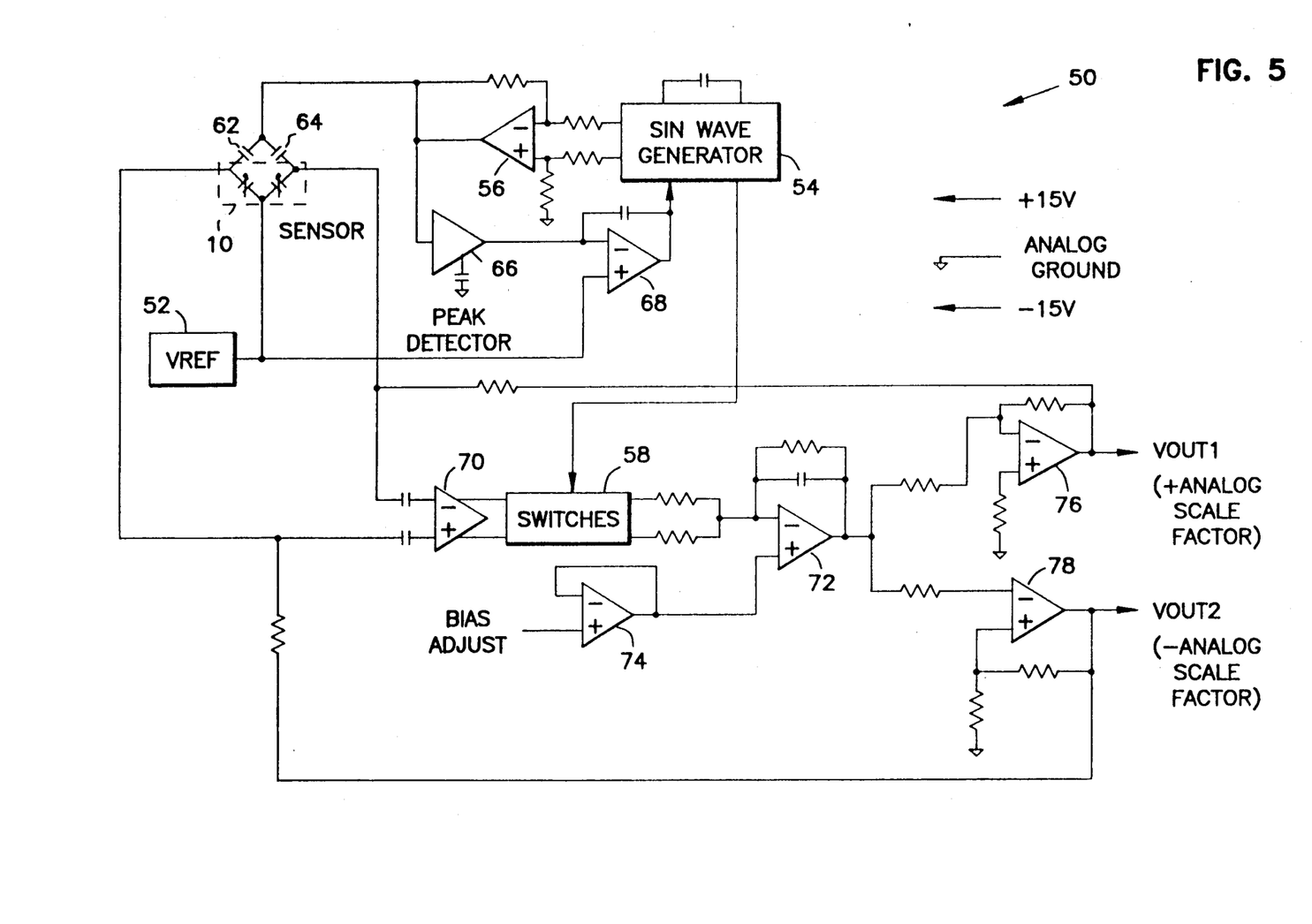
FIG. 5 is a schematic of the electrostatic rebalance loop electronics.
Figure 6:
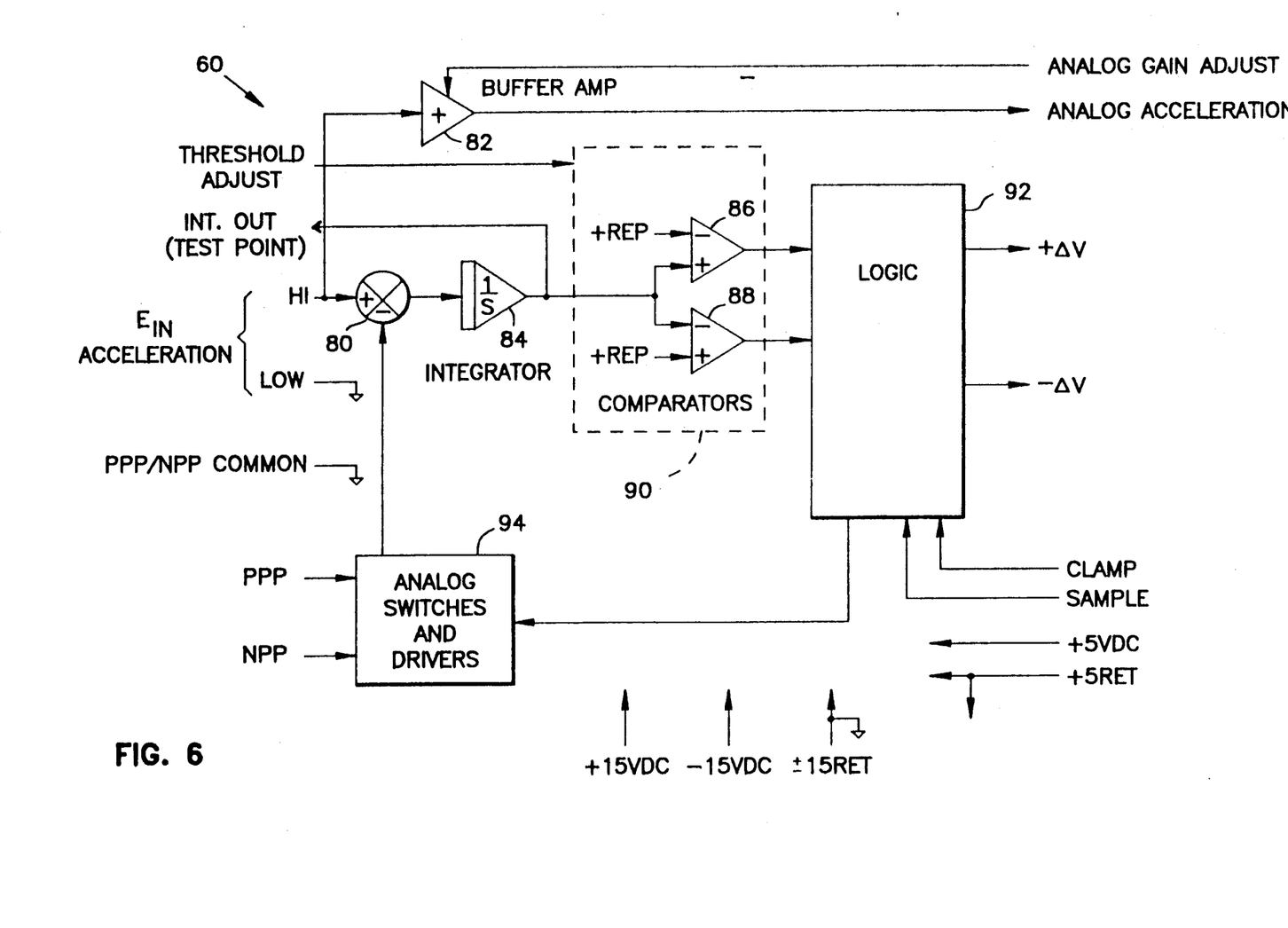
FIG. 6 is a diagram of the digitizer electronics.

The output of circuit 50 of FIG. 5 is connected to circuit 60 of FIG. 6. Circuit 60 is a digitizer loop that takes the analog output from amplifier 76 of circuit 50 and converts it to a digital output. The analog signal of circuit 50 goes to summation device 80 and to buffer amplifier 82. The output of summer 80 goes to integrator 84 which in turn provides an output to comparators 86 and 88 of circuit 90. Outputs of comparators 86 and 88 go on to logic circuit 92 which outputs delta voltage signals in a digital compatible format indicating acceleration measurements of capsule 10. A feedback signal from circuit 92 is sent to analog switches and drivers circuit 94. Circuit 94 has positive precision pulse (PPP) and negative precision pulse (NPP) inputs. The output of circuit 94 goes to summer 80. Various controlling and adjusting inputs include the sample and clamp signals to logic circuit 92, the analog gain adjust to amplifier 82 and the threshold adjust to comparator circuit 90.

Figure 7:
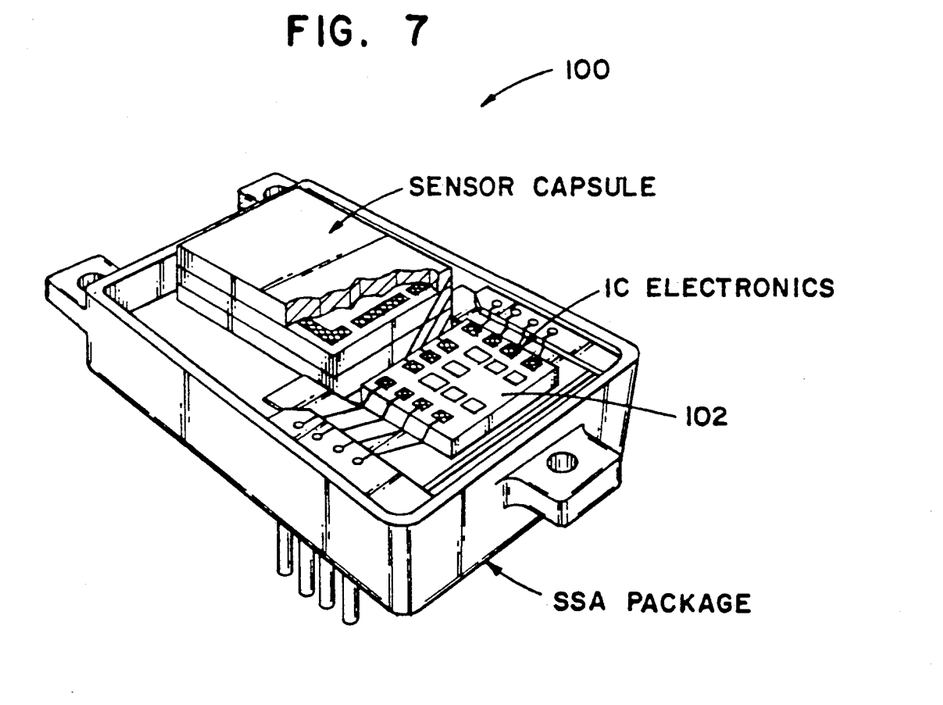
FIG. 7 is an illustration of the solid state accelerator sensor capsule, housing and electronics.

FIG. 7 shows the total package of the solid state accelerometer system as fabricated. The support electronics 102 which include analog rebalance loop 50 and digitizer loop 60 may be a monolithic or hybrid integrated circuit situated in package 100. Sensor capsule 10 and electronics 102 may be fabricated on a monolithic chip if desired. However, the present embodiment having capsule 10 and electronics 102 not on the same monolithic chip is presently less expensive than a monolithic chip for the complete accelerator system including support electronics 102.

I claim:

1. A solid state accelerometer, comprising:
    a first conductive silicon plate;
    a conductive silicon frame bonded to said first silicon plate;
    a first thin insulating oxidized silicon layer located between said first silicon plate and said silicon frame;
    a second conductive silicon plate bonded to said silicon frame;
    a second thin insulating oxidized silicon layer located between said second silicon plate and said silicon frame;
    wherein the bonding of the first and second silicon plates to the silicon frame results in an enclosure sealed from an external environment;
    a silicon conductive pendulum, situated within the enclosure, said pendulum comprising an epitaxial layer of silicon deposited between two silicon wafers and having at least one conductive silicon flexure connecting said pendulum to said frame; and
    feedback loop electronics electrically connected to said first and second plates and to said frame; and wherein:
    said pendulum is located between and approximately equidistant from said first and second plates;
    said pendulum and said first plate have a first capacitance;
    said pendulum and said second plate have a second capacitance;
    the first and second capacitances have first and second original values, respectively, that are nearly equal to each other in absence of any gravitational or acceleration force upon said accelerometer;
    said pendulum moves slightly upon an occurrence of any gravitational or acceleration force in a direction of a normal axis that intersects said first and second plates and said frame, thereby causing a slight change in the first and second capacitances;
    any movement of said pendulum from being approximately equidistant between said first and second plates is counteracted by electrostatic forces between said pendulum and said first and second plates, said electrostatic forces being generated by said feedback loop electronics which operate in response to slight changes in the first and second capacitances to provide voltages across said pendulum and said first silicon plate and across said pendulum and said second silicon plate sufficient to move the pendulum to a position approximately equidistant from said silicon plates; and
    magnitudes of the voltages provided indicate a magnitude of accelerational or gravitational force acting on said accelerometer in a direction approximately parallel to the normal axis.

2. Apparatus of claim 1 wherein said pendulum, said frame, and said first and second plates have approximately equal coefficients of thermal expansion.

3. Apparatus of claim 2 wherein each of said first and second insulating oxidized silicon layers has a thickness less than 3 microns.

4. Apparatus of claim 3 wherein said pendulum is a diaphragm.

5. A solid state accelerometer, comprising:
    a sensor capsule, comprising:
        a first doped silicon wafer;
        a doped layer of epitaxial silicon deposited on said first doped silicon wafer and patterned with dry etch to define a proof mass and one or more flexures;
        a second doped silicon wafer bonded to said epitaxial silicon layer;

a first dielectric interlayer deposited opposite said epitaxial silicon layer on said first doped silicon wafer and etched to form a first recessed area;

a second dielectric interlayer deposited opposite said epitaxial silicon layer on said second doped silicon wafer and etched to form a second recessed area; and third and fourth doped silicon wafers bonded to said first and second dielectric interlayers, respectively, to seal said capsule and to form a first gap over said first recessed area and a second gap over said second recessed area, said gaps defining first and second capacitors, respectively;

wherein said proof mass and flexures are formed by patterning and etching said first and second wafers and said epitaxial silicon layer; and feed back loop electronics electrically connected to said first capacitor and said second capacitor, said electronics operating to provide voltages as a function of gravitational or accelerational force applied to said proof mass by generating electrostatic forces required to force said proof mass and flexure to a null position approximately equidistant from said first and second wafers.

6. The solid state accelerometer according to claim 5 wherein said first and second wafers are $p^-$ doped, said third and fourth wafers are $p^-$ doped and said epitaxial silicon layer is $p^-$ doped.

7. The solid state accelerometer according to claim 5 wherein said proof mass and flexures form a pendulum.

8. The solid state accelerometer according to claim 5 wherein said proof mass and flexures form a diaphragm.

9. The solid state accelerometer according to claim 5 wherein said feedback loop electronics comprises:
    an analog rebalance loop connected to said first and second capacitors; and
    a digitizer loop connected to said analog rebalance loop circuit.

10. The solid state accelerometer according to claim 5 wherein said first and second dielectric interlayers comprise $SiO_2$ and $SiN_3$.

11. The solid state accelerometer according to claim 10 wherein said first and second dielectric interlayers are approximately 2 micrometers thick.

12. The solid state accelerometer according to claim 10 wherein said third and fourth wafers are fusion bonded to said epitaxial silicon layer.

* * * * *